Aug. 1, 1961  H. J. RECK ET AL  2,994,430
APPARATUS FOR GRADING EGGS AND THE LIKE
Filed Aug. 27, 1956  5 Sheets-Sheet 1

INVENTORS.
Herbert J. Reck
Hilbert W. Reck
By Wallenstein & Spangenberg
attys.

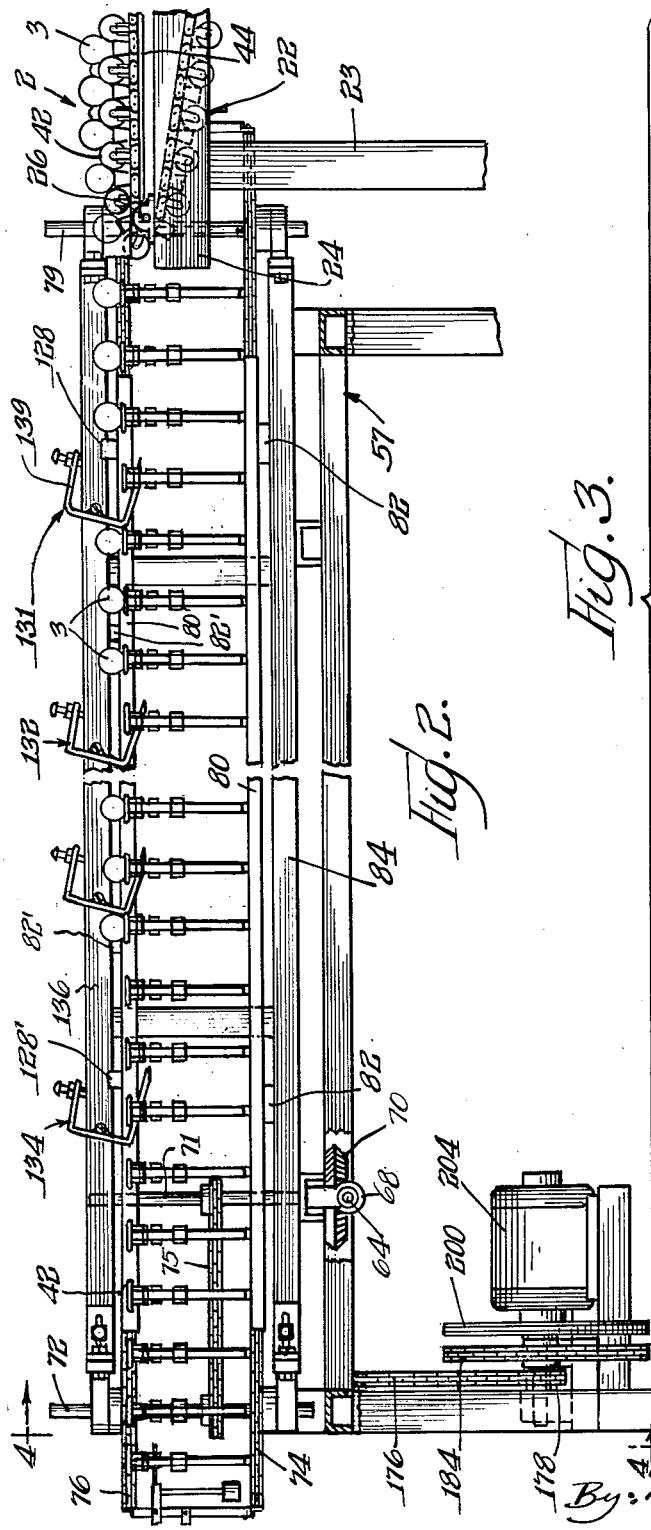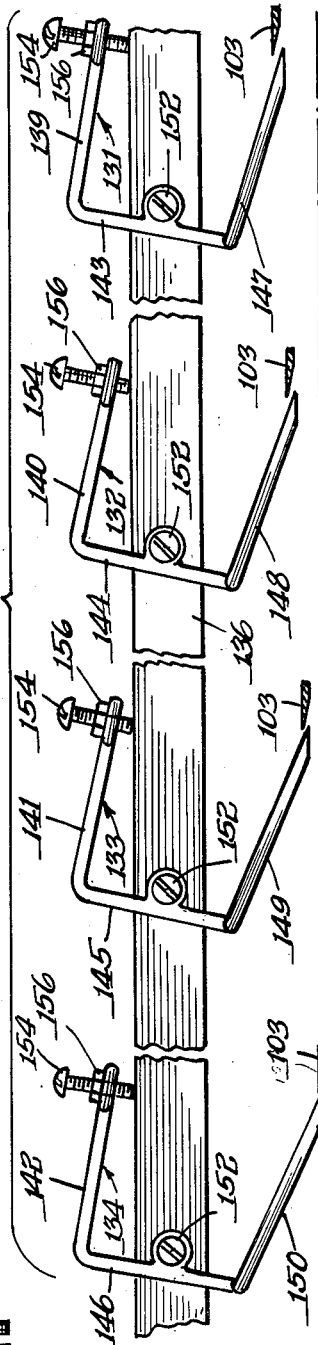

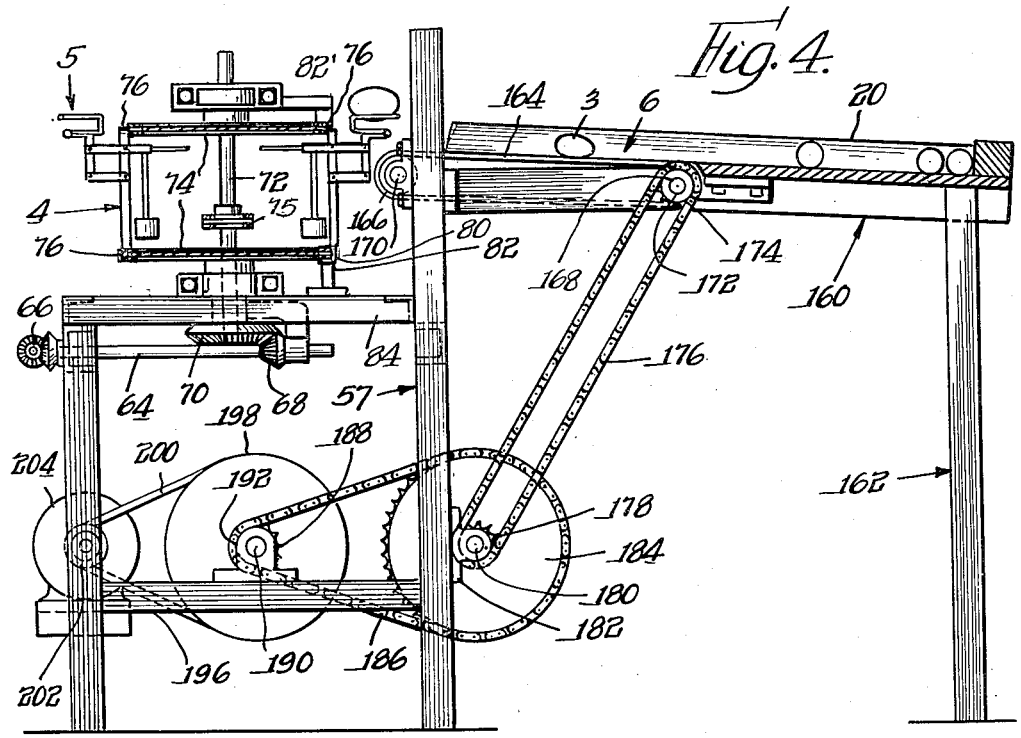
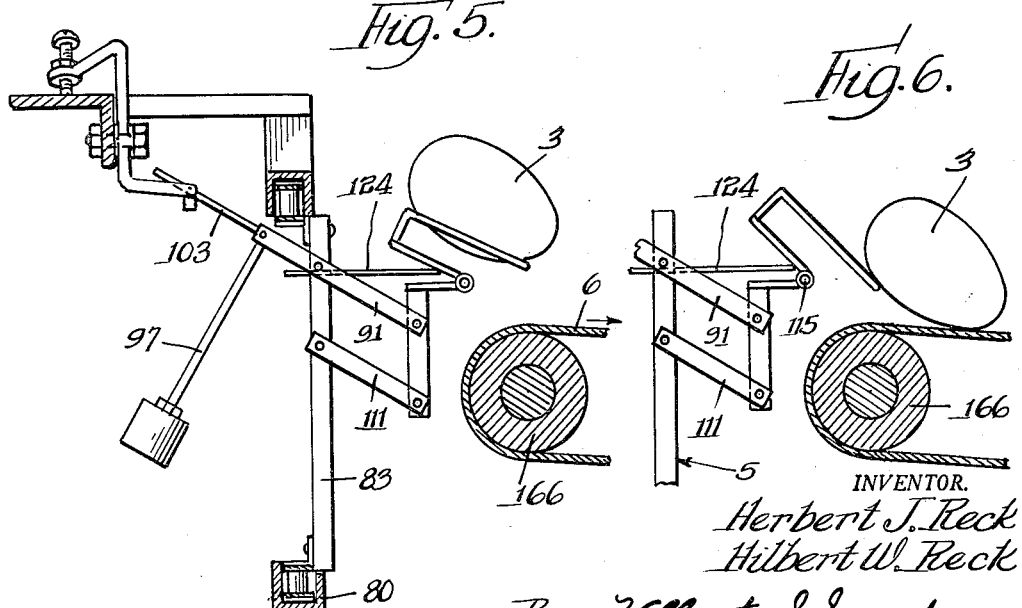

Aug. 1, 1961 H. J. RECK ET AL 2,994,430
APPARATUS FOR GRADING EGGS AND THE LIKE
Filed Aug. 27, 1956 5 Sheets-Sheet 4
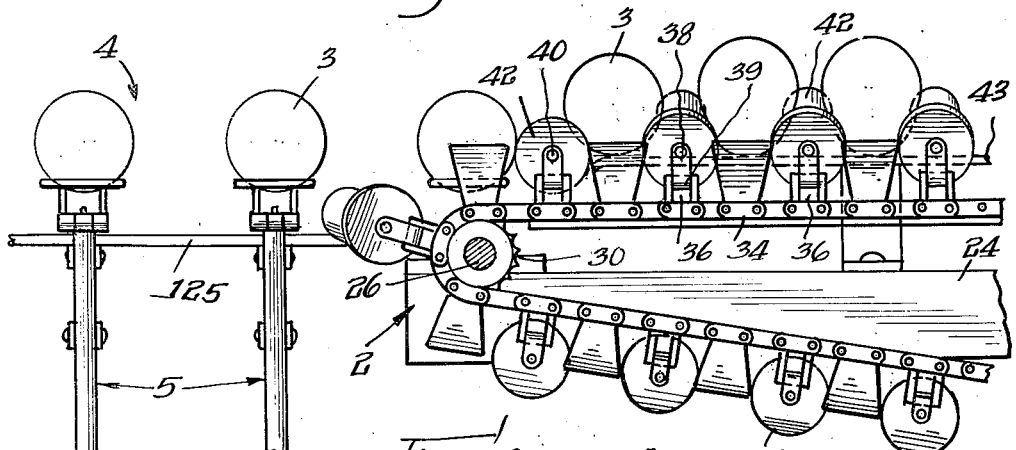
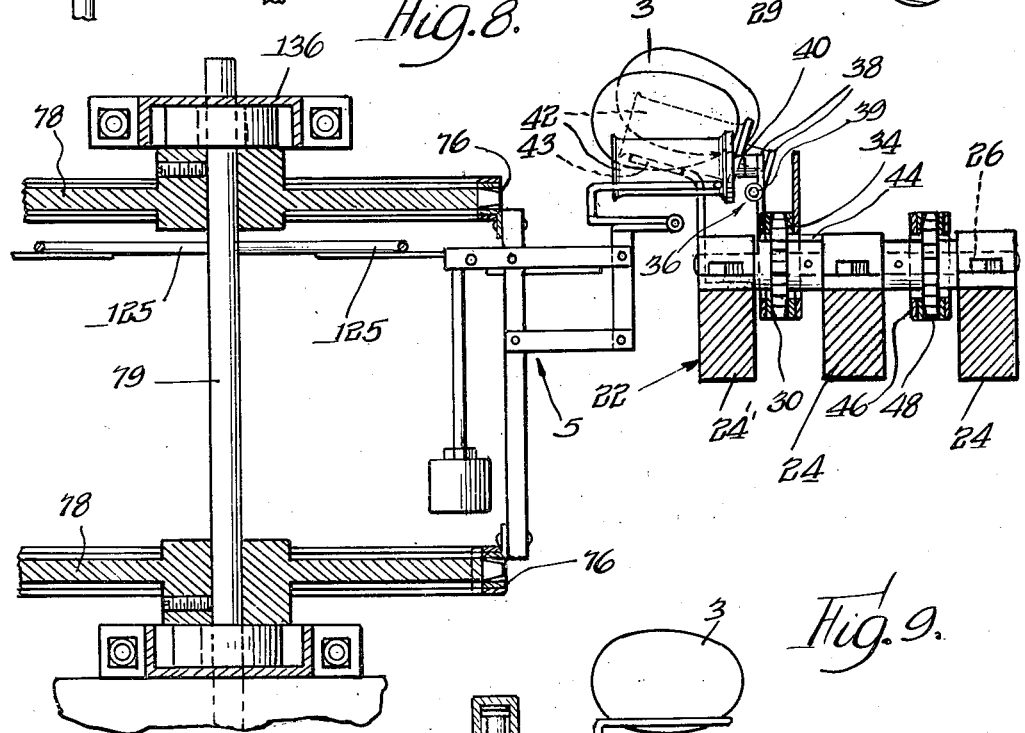
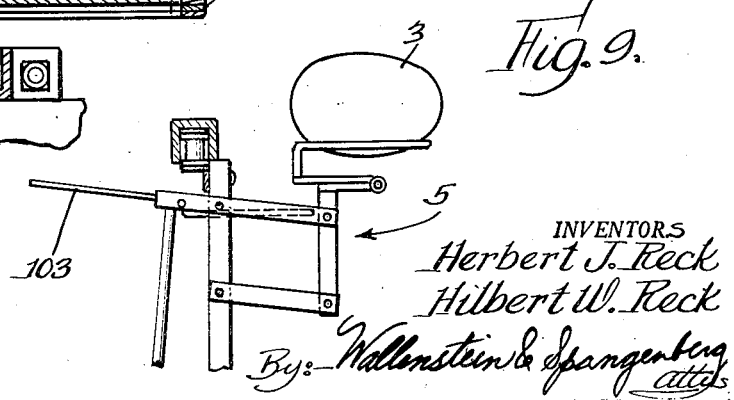
INVENTORS
Herbert J. Reck
Hilbert W. Reck
By: Wallenstein & Spangenberg
attys

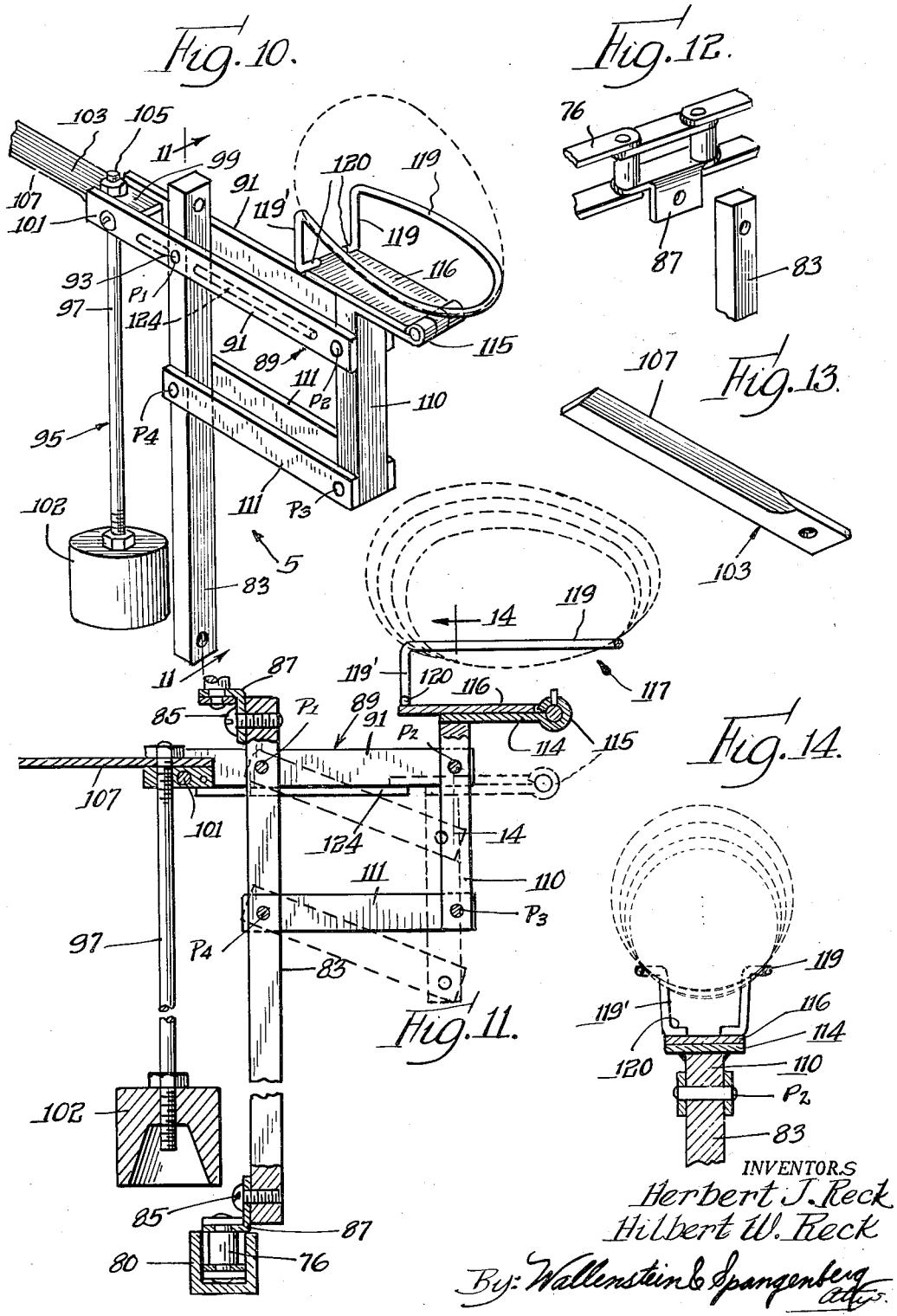

2,994,430
APPARATUS FOR GRADING EGGS AND THE LIKE

Herbert J. Reck and Hilbert W. Reck, both of 567 River Road, Elgin, Ill.
Filed Aug. 27, 1956, Ser. No. 606,522
10 Claims. (Cl. 209—121)

This invention relates to apparatus for grading eggs and the like by weight, and is particularly suitable for use with the feeding and candling apparatus disclosed in co-pending application Serial No. 409,668, filed February 11, 1954, entitled Feeding and Arranging Mechanism for Eggs, now Patent No. 2,919,787.

The primary object of the present invention is to provide weight-grading apparatus for eggs and the like which includes a conveyor carrying individual weighing fixtures which automatically receive eggs at a very rapid rate from an infeeding conveyor or the like, weigh the eggs and then deposit eggs of the same respective approximate weights at the same discharge points without damage to the eggs, and wherein the grading equipment is more simple and reliable than grading equipment heretofore available.

In accordance with a preferred form of the present invention, the above-mentioned weighing fixtures each include a balancing beam pivoted intermediate its ends to a support post about an axis extending longitudinally of the conveyor carrying the same. A counter-balancing weight is provided which is preferably carried at the bottom of a rod rigidly depending from a point on the balancing beam spaced from the pivot axis thereon. An egg-receiving or carrier means is supported upon an upstanding carrier support pivotally connected to the balancing beam on the side of the pivot axis thereof opposite that carrying the counter-balancing weight. A linkage is pivotally connected both to said carrier support member and to the post carrying the balancing beam so that the pivot points of the balancing beam, the carrier support member and the linkage fall along the corners of a parallelogram. This maintains the carrier support in a vertical orientation independently of the angle of tilt of the balancing beam. The egg-receiving means on the carrier support is thus normally maintained in a horizontal position so that the egg will not roll or fall off the egg-receiving means. The latter preferably has a horizontally extending, U-shaped wire portion forming a seat or cradle for eggs of various sizes. It is mounted on the carrier support member so that it can be tilted from its normally stable horizontal position. The elevations of the ends of each balancing beam are dependent on the weight of the egg carried thereby, the end carrying the counter-weight being the higher end. At the latter end of each balancing beam is a cam-engaging extension.

Spaced longitudinally along the conveyor carrying the fixtures are respective stationary cam surfaces inclining upwardly in the direction of movement of the conveyor. The bottom ends of these inclined cam surfaces are at progressively decreasing elevations proceeding in the direction of movement of the conveyor, and the respective elevations thereof correspond with and are in the path of travel of the cam-engaging extensions of the fixtures having eggs of weights at the lower limits of the various weight classes to be graded, such as extra large, medium and small egg classifications. The upper extremities of these cam surfaces are such that they will tilt the balancing beam associated with the cam-engaging extensions riding thereon beyond the angle produced by the largest egg to be accommodated by the grading equipment. Tilting means are provided on each weighing fixture for the associated pivotally mounted egg-receiving means to tilt the same to discharge the egg carried thereby onto an adjacent discharge station when the balancing beam is tilted beyond said angle. This tilting means preferably includes a lift rod extending from the support post of the balancing beam.

An out-feeding conveyor is preferably provided moving transversely of the fixture conveyor at the various discharge stations therealong so that the eggs discharged from the tilted egg-receiving means of the fixtures will roll lightly upon this transverse conveyor and be directed to suitable storage bins located to receive eggs of a particular weight class.

Other objects, advantages and features of the invention will become apparent upon making reference to the specfication to follow, the claims and the drawings wherein:

FIG. 2 is a side elevational view of the apparatus of FIG. 1 with the out-feeding transverse conveyor removed from view;

FIG. 3 is an enlarged fragmentary elevational view of a portion of the grading apparatus of FIGS. 1 and 2, showing the cam-engaging extensions of the weighing fixtures in position to engage and be raised by the inclined cam surfaces mounted along the fixture conveyor;

FIG. 4 is an end view of the apparatus of FIG. 2, taken along the line 4—4 thereof;

FIG. 5 is a fragmentary enlarged transverse section through a portion of the grading apparatus, taken along section line 5—5 in FIG. 2, showing the tilting of the balancing beam and the egg-receiving means of a weighing fixture when the cam-engaging extension rides upon the upper extremity of one of the inclined cam surfaces;

FIG. 6 shows a fragmentary view of the fixture in FIG. 5 as an egg is deposited upon the out-feeding conveyor;

FIG. 7 is an enlarged front elevation of the end of the in-feeding conveyor showing an egg being deposited in the egg-receiving means of one of the weighing fixtures, as would be seen along line 7—7 in FIG. 1;

FIG. 8 is a sectional view through the in-feeding conveyor and the fixture conveyor as would be viewed along line 8—8 in FIG. 1;

FIG. 9 is a view of an egg-weighing fixture after it has left the vicinity of the in-feeding conveyor;

FIG. 10 is a perspective view of the fixture shown in FIG. 9;

FIG. 11 is a partial vertical section of the fixture of FIG. 10, taken along line 11—11 thereof;

FIG. 12 is a fragmentary perspective view of a portion of the conveyor chain which carries the weighing fixture and shows the manner in which the fixture is secured to the chain;

FIG. 13 is a perspective view of the tapered cam-engaging extension of one of the fixtures; and FIG. 14 is a vertical section through the egg-receiving means of the fixture, taken along section line 14—14 in FIG. 11.

Figure 1:
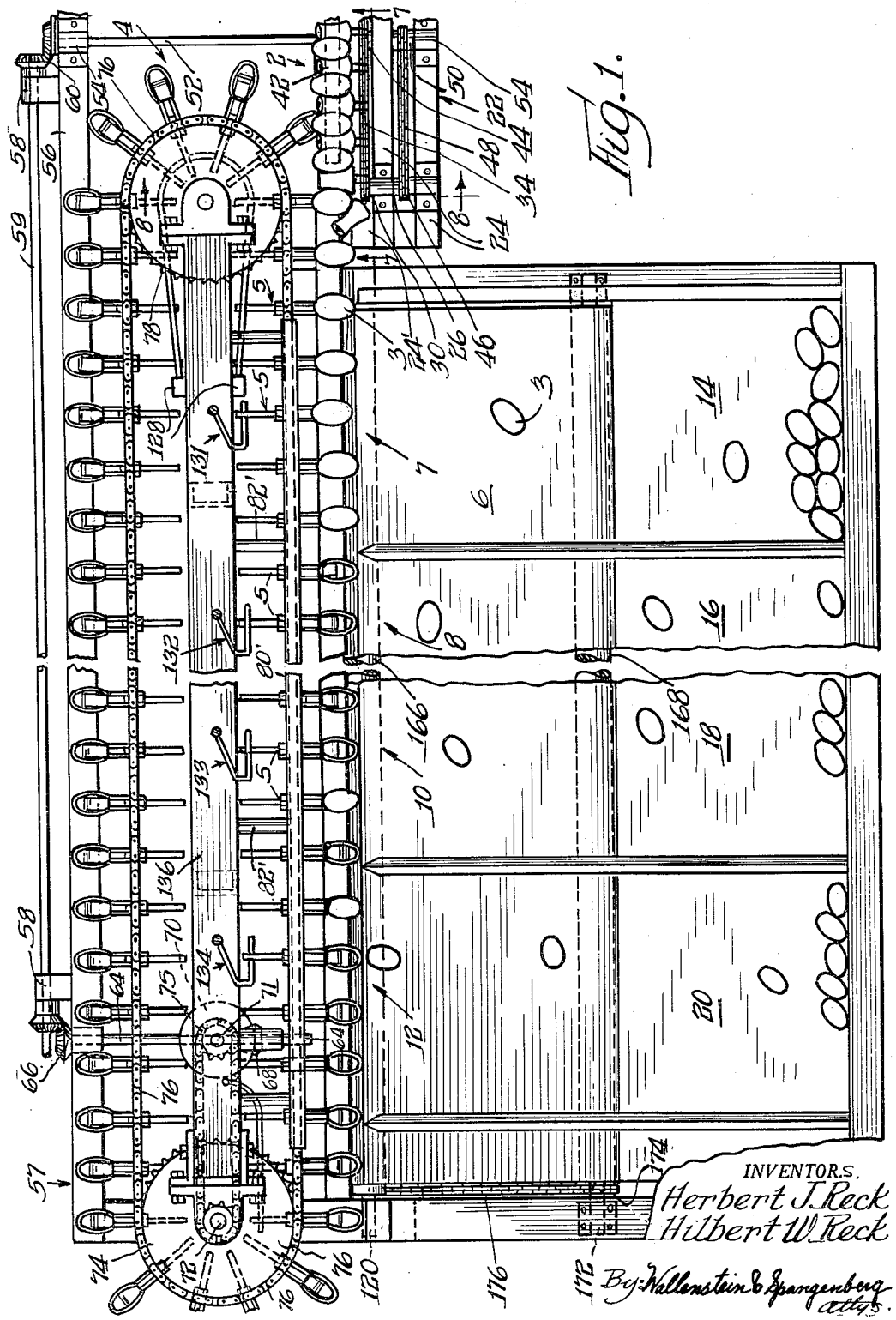
FIG. 1 is a plan view of the grading and feeding apparatus of the invention.

Referring more particularly to FIG. 1, an in-feeding conveyor 2 is shown discharging eggs to a fixture conveyor generally referred to by the reference numeral 4. Conveyor 4, which will be described in detail hereafter, carries weighing fixtures 5 which receive eggs 3 from the in-feeding conveyor, and moves the fixture opposite an out-feeding conveyor 6 moving transversely of the conveyor 4. Means to be described are provided for discharging the eggs falling into the extra large, medium and small size classifications opposite discharge stations 7, 8, 10 and 12, respectively, along the out-feeding conveyors 6. The eggs are moved by the conveyor to respective storage bins 14, 16, 18 and 20 transversely alined with the above mentioned discharge stations.

Refer now more particularly to FIGS. 1, 2, 7 and 8 which show the in-feeding conveyor 2, which in most respects is similar to the conveyor mechanism shown in FIGS. 20 through 26 in the aforesaid application Serial No. 409,668. The conveyor 2 moves the eggs opposite suitable candling apparataus (not shown) by means of which imperfections in the eggs may be viewed and defective eggs manually discarded from the conveyor. The conveyor 2 is supported upon a suitable framework 22 mounted upon suitable legs 23. The framework 22 has upper longitudinal support rails 24—24 (FIG. 8) from which is rotatably supported a horizontal shaft 26. A sprocket 30 is fixed to the shaft 26 and the sprocket wheel drives an endless chain 34. Secured at equally spaced intervals along the chain are brackets 36 each of which includes a mounting ear 38 pivotally secured to the bracket 36 by a hinge 39 whose axis extends longitudinally of the conveyor chain. Rotatably supported upon a pivot rod 40 extending from the mounting ear 38 is a spool 42. The outer ends of the spools attached to the upper section of the chain 34 ride upon a cam track 43 supported from the framework 22. The upper section of the conveyor chain 34 slides and is supported upon a rail 44 carried by the support structure 22.

The eggs 3 are carried between adjacent spools. The spools rotate as they ride along the cam track 43 to rotate the eggs 3 for candling the eggs in the manner described in the aforesaid application. For this purpose, the spools are inclined at a substantial angle to the vertical so that the ends of the eggs containing the large air cells are at the tops of the eggs. As the spools are moved opposite the fixture conveyor 4, the spools move into a generally horizontal position, as shown most clearly in FIG. 8.

As a spool 42 is carried around the sprocket wheel 30, the egg 3 engaging the trailing side thereof loses support and drops onto one of the fixtures 5 which is moved in to position below the latter egg at this moment. This operation requires that the fixture conveyor 4 be driven in timed relation to the movement of the in-feeding conveyor 2. To this end, a power take off is taken from the shaft 26 for the conveyor 4 by a sprocket 46 (see FIGS. 1 and 8) fixed to the latter shaft and a chain 48 extending around the sprocket 46 and another sprocket 50 fixed to a shaft 52 journalled at one end in bearings 54—54, respectively, in one of the frame rails 24 and a longitudinal rail 56 carried by the framework 57 associated with the conveyor 4. The framework 57 supports bearings 58—58 which rotatably support a longitudinal shaft 59 which is coupled at one end to the latter drive shaft 52 by suitable bevel gears 60. At the other end the longitudinal shaft 59 is coupled to a transverse shaft supported upon the support structure 57 by suitable bevel gears 66. Referring more particularly to FIGS. 1 and 4, the shaft 64 drives a small bevel gear 68 which meshes with a bevel gear 70 supported for rotation about a vertical axis. The bevel gear 70 is fixed to a shaft 71 suitably journalled upon the support structure 57.

The shaft 71 is coupled to another vertical shaft 72 at the end of the support structure 57 by a chain and sprocket transmission 75. Supported in vertically spaced relation upon the shaft 72 are large chain sprocket wheels 74—74. Each of these sprocket wheels drives an endless chain 76—76 which passes around respective vertically spaced sprocket wheels 78—78 rotatably supported at the other end of the frame structure 57 upon a shaft 79 carried by the support structure 57. The chains 76 ride within vertically spaced guides 80—80' carried by brackets 82—82'.

The weighting fixtures 5 are secured between corresponding portions of the upper and lower endless chains 76—76. These fixtures, which are equally spaced along these chains, are shown most clearly in FIGS. 10 through 14 to which reference should now be made. They each include a vertical beam support post 83 which is secured at its upper end by a screw 85 to an ear 87 secured to a link of the chain 76. The lower end of the beam support post 83 is similarly secured by a screw 85 to an ear 87 secured to the lower chain 76. A balancing beam 89 is pivotally secured intermediate its ends to the bar 83. This beam is formed from two similar metal bars 91—91 which are pivoted to opposite sides of the post 83 at 93—93. When the fixture is secured to the chains 76—76, the balancing beam extends transversely of the length of the conveyor chains. Secured to the end of the beam 89 nearest the inner portion of the conveyor 4 is a counter weight assembly 95. This assembly includes a rod 97 which is fixed at its upper end to a small metal block 99 anchored between the beam arms 91—91 by a nut and bolt 101. Removably threaded around the bottom end of the rod 97 is a cylindrical counter weight 102. Extending inwardly longitudinally from the end of the beam arms 91—91 is a cam engaging extension blade 103 which is secured to the block 99 by a nut and bolt 105. As shown most clearly in FIG. 13, this blade has a sharp edge 107 which faces in the direction of movement of the conveyor.

Pivotally secured to the opposite end of the balancing beam 89 is a vertical carrier support member 110. The member 110 extends below the beam 89 where it pivotally connects with the pair of opposed connecting links 111—111. The inner ends of the links 111—111 are pivotally connected to opposite sides of the beam support post 83. The points of pivotal support for the beam arms 91—91, carrier bar 110 and the connecting links 111—111 fall along the corners of a parallelogram at P1, P2, P3 and P4. Because of this arrangement, the carrier support member 110 is maintained in a vertical direction independently of the angle tilt of the balancing beam.

The carrier support member 110 extends a short distance above the beam 89 and at the top of this bar is secured a horizontal support 114 which is formed into a hinge socket 115 at the forward or outermost end thereof. Pivotally supported in the socket 115 is the base 116 of an egg-receiving means 117. The latter means includes a wire support 119 whose intermediate portion is bent into a U-shaped section extending in a generally horizontal plane. The end portions of the wire are bent downwardly at 119' which portions terminate in in-turned ends 120 which are soldered or otherwise secured to the base 116. The egg-receiving means 117 is supported in a generally horizontal position upon the horizontal member 114 carried by the carrier bar 110. Normally, therefore, the plane of the U-shaped portion of the wire 119 is maintained in a horizontal plane for substantially all angular positions of the balancing beam 89. This is true for all angular positions of the balancing beam obtained by eggs within the range of weights to be used with the apparatus. As is apparent from the description of the weighing fixture, the heavier the eggs supported upon the egg-receiving means 117, the lower is the outer or forward end of the balancing beam and the higher is the opposite end of the balancing beam.

Means are provided for tilting the egg-receiving means about the axis of the pivot socket 115 when the forward or outer end of the balancing beam is lowered beyond the limit obtained with an egg of the largest expected weight. This means includes a lift rod 124 which extends generally horizontally from the beam support post 83 immediately below the bottom of the balancing beam. When the beam reaches the angle of tilt indicated by dotted lines in FIG. 11, the lift rod 124 initially makes contact with the bottom of the rear or inner portion of the base 116 of the egg-receiving means 117. Further tilting of the balancing beam will cause the lift rod to tilt the egg-receiving means about its pivot axis to the position shown in FIGS. 5 and 6 where the egg 3 supported thereon falls from the wire seat 119. The lift rod projects rearwardly of the beam support bar to stop the downward movement of the rear end of the balancing beam beyond a horizontal position.

Before explaining the manner in which the balancing beam is tilted to a limit which causes tilting of the egg-receiving means, explanation of the manner in which an egg is transferred from the in-feeding conveyor 2 to the conveyor 4 of the grading apparatus will be described. For this purpose, reference should be had to FIGS. 7 and 8. As there shown, the U-shaped wire portion 119 of the egg-receiving means 117 is carried by the conveyor 4 beneath the leading egg 3 as the forwardmost spool thereof is pulled around the sprocket 30. Since the wire portion 119 is only a short distance beneath the spools 42 at the end of the conveyor 2, the eggs fall lightly onto the egg-receiving means. Clearance is provided for movement of the fixtures opposite the discharge station by cantilevering the end portion of the cam track 43 for a distance forwardly of the bracket which secures it to the support frame 22. During transfer of an egg from the in-feeding conveyor to the conveyor 4, the balancing beams of the fixtures to be moved opposite the in-feeding conveyor 2 are held rigidly in a horizontal position by means of a stationary cam support member 125 under which the cam-engaging extensions 103 of the fixtures pass, as shown most clearly in FIG. 8. The balancing beams cannot move in either direction in this case because the cam member 125 prevents upward movement of the rear ends of the associated balancing beams and the rear extensions of the lift rods 124 prevent downward movement of the rear beam ends. The cam member 125 is located just beneath the uppermost sprocket wheel 78 and is supported upon the frame structure 57 by support posts 128 extending from the platform of the frame structure, as shown most clearly in FIGS. 1 and 2.

As the weighing fixtures are moved a short distance beyond the in-feeding conveyor 2, the cam-engaging extensions 103 of the fixtures leave the locking cam member 125 whereupon the balancing beams thereof may assume an angular position determined by the weight of the eggs supported thereby, as shown in FIG. 9. For eggs varying in weight from the heaviest to the lightest weight classifications, the cam-engaging extensions 103 of the fixtures will assume progressively decreasing ranges of elevation. This provides a means for sorting eggs within given weight classifications. To this end, a number of cam elements 131, 132, 133 and 134 (see FIGS. 1 through 3) are supported from a longitudinal channel member 136 supported above the platform of the support structure 57. Each of the cam elements has an upper arm (FIG. 3) 139, 140, 141 or 142, and a depending intermediate arm 143, 144, 145 or 146 and a bent-back lower arm inclining downwardly and rearwardly at 147, 148, 149 or 150. The upper surfaces of the lower arms of these cam elements form respective cam surfaces which incline upwardly proceeding in the direction of movement of the conveyor 4. The intermediate arms of these cam elements are pivotally secured by pivot screws 152 to the side of the channel member 136 at points opposite the respective discharge stations 7, 8, 10 and 12.

The elevations of the bottom ends of these cam surfaces are determined by screws 154 threading through the upper arms of these elements and bearing upon the upper surface of the channel member 136. Locking nuts 156 are provided for fixing the adjusted position of these screws. The elevation of the bottom end of the first cam element is adjusted so that its upper surface intercepts the cam-engaging extensions of the weighing fixtures supporting eggs of the extra large classification. The bottom ends of the succeeding cam elements are adjusted respectively to intercept the cam-engaging extensions of fixtures carrying eggs respectively in the large, medium and small classifications. The bottom rear edges of the lower arms of the cam elements are beveled to provide pointed ends to prevent locking abutment between the sharp leading edges of the cam-engaging extensions of the fixtures and the cam elements. As a cam-engaging extension of one of the fixtures rides up one of the aforementioned cam surfaces of the cam elements 131 through 134, the balancing beam of the associated fixture is raised to a point where the associated lift rod engages the rear end of the base 116 of the egg-receiving means to tilt the same to discharge the egg carried thereby onto the out-feeding conveyor 6.

Referring now more particularly to FIG. 4, the out-feeding conveyor 6 is supported upon a raised support platform 160 resting on legs 162. The conveyor 6 is a belt-type conveyor including an endless belt 164 which extends around friction rollers 166 and 168 fixed to shafts 170—172 journaled in bearings secured to the framework 57 and to the framework 160. A sprocket wheel 174 is secured to the shaft 168 and receives an endless chain 176 extending around a drive sprocket wheel 178 fixed to a shaft 180 journaled in a bearing 182 secured to the framework 57. A larger sprocket wheel 184 is secured to the shaft 180 and receives an endless chain 186 driven by a drive sprocket wheel 188. The drive sprocket wheel 188 is fixed to a shaft 190 journaled in bearings 192 supported upon a platform 196 secured to the framework 57. The shaft 190 carries a pulley 198 which is driven from a belt 200 driven by a drive pulley 202 secured to the shaft of an electric motor 204.

The upper section of the belt 164 is moved away from the conveyor 4 to carry the eggs 3 to one of bins 14, 16, 18 and 20. The bottoms of these bins slant slightly away from the end of the out-feeding conveyor 6 and are approximately at the same elevation as the upper section of the conveyor belt 164. The eggs are thus transferred to the bins with a minimum of shock and move slowly down to the forward bottom ends of the bins.

The grading, sorting and feeding apparatus above described is extremely rapid in operation and is much more simple and reliable than prior apparatus heretofore proposed. The handling of the eggs is accomplished in a manner which minimizes the breakage of the eggs, and with equipment which is relatively inexpensive to construct and maintain.

It should be understood that numerous modifications may be made of the preferred form of the invention above described without deviating from the broader aspects of the invention.

It is claimed as new and desired to be protected by Letters Patent of the United States:

1. Grading apparatus for eggs and the like comprising: a conveyor, a number of individual egg-weighing fixtures carried by said conveyor, means for moving said conveyor past a number of egg-discharge stations spaced along side of the conveyor and at which eggs of different respective sizes are to be discharged from said fixtures, each of said egg-weighing fixtures including upstanding beam support means, a transversely extending balancing beam pivoted intermediate its ends to said beam support means for movement about a horizontal axis extending longitudinally of the conveyor, a counterweight rod secured at its top to said beam on the side of the pivot axis thereof furthest from the conveyor side where said discharge stations are located, the rod depending from the beam and carrying at the bottom thereof a counterweight, said beam having cam-engaging means extending generally transversely of said conveyor from the side of the beam carrying said counterweight, an egg carrier support pivotally mounted upon said balancing beam on the other side of the pivot axis thereof, a connecting link pivotally connected at one end to said carrier support and pivotally connected at the other end to said beam support means, the pivot points at the ends of said connecting link being located at the corners of a parallelogram, the points of pivot of said balancing beam and carrier support falling at the other corners of the parallelogram so that the vertical orientation of the carrier support remains substantially constant with variation in the angle of tilt of the balancing beam, said carrier support adjacent to the top thereof carrying egg-receiving means mounted thereon for tilting movement with respect thereto about a horizontal axis extending parallel to the pivot axis of said balancing beam, said egg-receiving means including a generally horizontally extending, U-shaped wire frame adapted to support between the sides thereof eggs of various sizes, said egg-receiving means having a portion extending inwardly of said pivot axis, a lift rod extending from said beam support and adapted to engage the bottom of the latter portion of said egg-receiving means to tilt the same, said lift rod making initial contact with said latter portion of said egg-receiving means when the beam has been tilted substantially beyond the angle of tilt obtained when the egg-receiving means is carrying an egg of the largest size to be accommodated thereby, respective stationary cam means spaced longitudinally of said conveyor system and at different elevations in the path of movement of said cam-engaging means of fixtures supporting respectively eggs of a number of respective sizes, said cam-engaging means when engaged by one of said cam means being raised an amount to tilt the associated balancing beam to an angle where said tilt rod engages and tilts said egg-receiving means to discharge the egg carried thereon.

2. Grading apparatus for eggs and the like comprising: a conveyor, a number of individual egg-weighing fixtures carried by said conveyor, means for moving said conveyor past a number of egg-discharge stations spaced along side of the conveyor and at which eggs of different respective sizes are to be discharged from said fixtures, each of said egg-weighing fixtures including upstanding beam support means, a transversely extending balancing beam pivoted intermediate its ends to said beam support means for movement about a horizontal axis extending longitudinally of the conveyor, a counterweight rod secured at its top to said beam on the side of the pivot axis thereof furthest from the conveyor side where said discharge stations are located, the rod depending from the beam and carrying at the bottom thereof a counterweight, said beam having cam-engaging means extending generally transversely of said conveyor from the side of the beam carrying said counterweight, an egg carrier support pivotally mounted upon said balancing beam on the other side of the pivot axis thereof, said carrier support adjacent to the top thereof carrying egg-receiving means mounted thereon for tilting movement with respect thereto about a horizontal axis extending parallel to the pivot axis of said balancing beam, said egg-receiving means having a portion extending inwardly of said pivot axis, a lift rod extending from said beam support and adapted to engage the bottom of the latter portion of said egg-receiving means to tilt the same, said lift rod making initial contact with said latter portion of said egg-receiving means when the beam has been tilted substantially beyond the angle of tilt obtained when the egg-receiving means is carrying an egg of the largest size to be accommodated thereby, respective stationary cam means spaced longitudinally of said conveyor system and at different elevations in the path of movement of said cam-engaging means of fixtures supporting respectively eggs of a number of respective sizes, said cam-engaging means when engaged by one of said cam means being raised an amount to tilt the associated balancing beam to an angle where said tilt rod engages and tilts said egg-receiving means to discharge the egg carried thereon.

3. Grading apparatus for eggs and the like comprising: a conveyor system having two vertically spaced endless chains of the same size extending around a pair of coaxially mounted sprocket wheels at each end of the conveyor, a number of individual egg-weighing fixtures carried by said conveyor system, means for moving said conveyor past a number of egg-discharge stations spaced along side of the conveyor and at which eggs of different respective sizes are to be discharged from said fixtures, each of said egg-weighing fixtures including upstanding beam support means whose ends are fixed to corresponding portions of said vertically spaced endless chains, a transversely extending balancing beam pivoted intermediate its ends to said beam support means for movement about a horizontal axis extending longitudinally of the conveyor, a counterweight rod secured at its top to said beam on the side of the pivot axis thereof furthest from the conveyor side where said discharge stations are located, the rod depending from the beam and carrying at the bottom thereof a counterweight, said beam having cam-engaging means extending generally transversely of said conveyor from the side of the beam carrying said counterweight, said cam-engaging means having a thin edge facing in the direction movement of the conveyor, an egg carrier support pivotally mounted upon said balancing beam on the other side of the pivot axis thereof, said carrier support having a portion extending below said balancing beam, a connecting link pivotally connected at one end to said carrier support below said beam support and pivotally connected at the other end to said beam support means, the pivot points at the ends of said connecting link being located at the corners of a parallelogram, the points of pivot of said balancing beam and carrier support falling at the other corners of the parallelogram so that the vertical orientation of the carrier support remains substantially constant with variation in the angle of tilt of the balancing beam, said carrier support adjacent to the top thereof carrying egg-receiving means mounted thereon for tilting movement with respect thereto about a horizontal axis extending parallel to the pivot axis of said balancing beam, said egg-receiving means including a generally horizontally extending, U-shaped wire frame adapted to support between the sides thereof eggs of various sizes, said egg-receiving means having a portion extending inwardly of said pivot axis, a lift rod extending from said beam support and adapted to engage the bottom of the latter portion of said egg-receiving means to tilt the same, said lift rod making initial contact with said latter portion of said egg-receiving means when the beam has been tilted substantially beyond the angle of tilt obtained when the egg-receiving means is carrying an egg of the largest size to be accommodated thereby, respective stationary cam means spaced longitudinally of said conveyor system and at different elevations in the path of movement of said cam-engaging means of fixtures supporting respectively eggs of a number of respective sizes, said thin leading edge of said cam-engaging means when engaged by one of said cam means being raised an amount to tilt the associated balancing beam to an angle where said tilt rod engages and tilts said egg-receiving means to discharge the egg carried thereon.

4. An egg-weighing fixture comprising: an upstanding beam support, a balancing beam pivoted intermediate its ends to said beam support, a counterweight rod secured at its top to said beam on one side of the pivot axis thereof, the rod depending from the beam and carrying at the bottom thereof a counterweight, said beam having cam-engaging means extending longitudinally from the side of the beam carrying said counterweight, said cam-engaging means having a thin leading edge, an egg carrier support pivotally mounted upon said balancing beam on the other side of the pivot axis thereof, a connecting link pivotally connected at one end to said carrier support and pivotally connected at the other end to said beam support, the pivot points at the ends of said connecting link being located at two corners of the parallelogram and the pivot points of said balancing beam and the carrier support being at the other two corners of the parallelogram, so that vertical orientation of the carrier support remains substantially constant with variation in the angle of tilt of the balancing beam, said carrier support adjacent to the top thereof carrying egg-receiving means mounted thereon for tilting movement with respect thereto about a horizontal axis extending parallel to the pivot axis of said balancing beam, said egg-receiving means including a generally horizontally extending, U-shaped wire frame adapted to support between the sides thereof eggs of various sizes, and a lift rod extending from said beam support and adapted to engage the bottom of said egg-receiving means to tilt the same, said lift rod making initial contact with said latter portion of said egg-receiving means when the beam has been tilted beyond the angle of tilt obtained when the egg-receiving means is carrying an egg of the largest size to be accommodated thereby.

5. An egg-weighing fixture comprising: an upstanding beam support, a balancing beam pivoted intermediate its ends to said beam support, a counterweight rod secured at its top to said beam on one side of the pivot axis thereof, the rod depending from the beam and carrying at the bottom thereof a counterweight, said beam having cam-engaging means extending longitudinally from the side of the beam carrying said counterweight, an egg carrier support pivotally mounted upon said balancing beam on the other side of the pivot axis thereof, said carrier support adjacent to the top thereof carrying egg-receiving means mounted thereon for tilting movement with respect thereto about a horizontal axis extending parallel to the pivot axis of said balancing beam, said egg-receiving means including a generally horizontally extending, U-shaped wire frame adapted to support between the sides thereof eggs of various sizes, and a lift rod extending from said beam support and adapted to engage the bottom of said egg-receiving means to tilt the same, said lift rod making initial contact with said latter portion of said egg-receiving means when the beam has been tilted beyond the angle of tilt obtained when the egg-receiving means is carrying an egg of the largest size to be accommodated thereby.

6. An egg-weighing fixture comprising: an upstanding beam support, a balancing beam pivoted intermediate its ends to said beam support, a counterweight rod secured at its top to said beam on one side of the pivot axis thereof, the rod depending from the beam and carrying at the bottom thereof a counterweight, an egg carrier support pivotally mounted upon said balancing beam on the other side of the pivot axis thereof, a connecting link pivotally connected at one end to said carrier support and pivotally connected at the other end to said beam support, the pivot points at the ends of said connecting link being located at two corners of a parallelogram and the pivot points of said balancing beam on said beam support and said carrier support on said balancing beam being at the other two corners of the parallelogram, so that vertical orientation of the carrier support remains substantially constant with variation in the angle of tilt of the balancing beam, said carrier support adjacent to the top thereof carrying egg-receiving means mounted thereon for tilting movement with respect thereto about a horizontal axis extending parallel to the pivot axis of said balancing beam, and a lift rod extending from said beam support and adapted to engage the bottom of said egg-receiving means to tilt the same, said lift rod making initial contact with said latter portion of said egg-receiving means when the beam has been tilted beyond the angle of tilt obtained when the egg-receiving means is carrying an egg of the largest size to be accommodated thereby.

7. A grading machine for eggs and the like comprising: conveyor means including a pair of vertically spaced, horizontally positioned, elongated endless conveyor chains extending around horizontally spaced pairs of sprocket wheels mounted for rotation about vertical axes, said conveyor chains carrying a number of egg-weighing fixtures distributed about the periphery thereof, each of said egg-weighing fixtures including a vertical beam support anchored to the outside of corresponding portions of said chains, a beam pivotally mounted to said beam support about a horizontal axis, counterweight means carried by said beam on one side of the pivot axis thereof, an egg carrier pivotally mounted upon said beam on the opposite side of the pivot axis thereof about a horizontal tilt axis and means normally holding the egg carriers substantially level, respective means spaced along said conveyor means and in the paths of movement of the fixture beams having different respective elevations corresponding to different ranges of egg weights, for tilting the associated egg carriers to discharge the eggs thereon, and means for receiving the eggs discharged from said egg carriers, said last-mentioned means including soft flexible conveyor belt means which receives the eggs falling off the egg carriers without damaging the same.

8. A grading machine for eggs and the like comprising: conveyor means, a number of individual egg-weighing fixtures carried by said conveyor means, means for moving said conveyor means past a number of egg discharge stations at which eggs of different respective sizes are to be discharged from said fixtures, each of said egg-weighing fixtures including a beam support, a beam pivotally mounted to said beam support about a horizontal axis extending in the direction of movement thereof by said conveyor means, counterweight means carried by and rigidly fixed to said beam on one side of the pivot axis of said beam, an upstanding carrier support member pivotally mounted upon said beam on the opposite side of said beam pivot axis, an egg carrier designed only to carry an egg with its longitudinal axis extending transversely of the direction of movement of said conveyor means and mounted upon said carrier support member about a tilt axis located outwardly of the innermost portion thereof and extending generally parallel to the pivot axis of said beam, means normally holding the egg carriers level, means associated with said carrier support member for maintaining the vertical orientation of said support member and hence the horizontal orientation of said egg carrier supported thereby as the angle of tilt of said beam varies over a range of values corresponding with the expected range of egg weights to be graded, said last-mentioned means comprising a link arm spaced from and parallel to said beam and pivotally secured to said carrier support member and to said beam support at points spaced the same distance from the points of pivot of said beam and said carrier support and spaced apart the same distance as said latter two points, egg-carrier tilting means fixed to said beam support and extending below said egg carrier at a point inwardly of the pivot axis thereof for tilting the outer end of said egg carrier downwardly to cause the egg carried thereon to slide off the carrier when the contiguous end of said beam is tilted down at an angle beyond said range of values, and respective cam means mounted opposite said egg discharge stations, said cam means comprising inclined tracks tilting upwardly in the direction of movement of the conveyor means and the lower ends being at progressively increasing elevations proceeding in the direction of movement of the conveyor means and being located in the paths of travel of the ends of said fixture beams opposite the ends carrying said egg carriers for tilting the latter ends progressively downward until said carrier tilting means engages and tilts the associated egg carrier, discharge conveyor means moving transversely away from said first-mentioned conveyor means at said discharge stations immediately below said egg carriers where the latter conveyor means receives the eggs as they slide off said tilted egg carriers with their longitudinal axes parallel to the direction of movement of the latter conveyor means, and respective bins positioned across the discharge end of said transverse conveyor means and aligned to receive eggs of different respective weights from the end of said transverse conveyor means.

9. A grading machine for eggs and the like comprising: an elongated vertically oriented, endless infeeding conveyor having a straight upper section which is generally horizontal, said infeeding conveyor having equally-spaced egg-receiving stations spaced therealong for respectively carrying eggs to a discharge station located at one end of the upper section of the conveyor, said egg-receiving stations each being formed by a pair of spaced apart egg-cradling elements between which an egg is cradled on the upper section of the conveyor, the egg losing support when the leading cradling element is carried down around one end of the conveyor, an elongated horizontally oriented endless conveyor extending past said discharge station and having egg-weighing fixtures evenly distributed therealong and moved in a path by the latter conveyor which underlaps said discharge station and is substantially parallel thereat to the direction of movement of the upper section of said infeeding conveyor, each of said fixtures having a vertically movable weight-responsive means and an egg-receiving pocket carried by the weight-responsive means, the egg-receiving pockets being moved by said latter conveyor immediately beneath the egg-cradling elements at said discharge station where the eggs are transferred thereto, means for continuously moving said endless conveyors in timed relation wherein an egg-receiving pocket is carried immediately beneath each egg as it is delivered to said discharge station, each egg falling into a fixture pocket as the leading cradling element of the associated pair drops below the conveyor top, and means responsive to the degree of downward movement of the weight-responsive means of the fixtures for depositing the eggs at different points along the associated conveyor according to weight.

10. The machine defined in claim 9 wherein there is further provided means associated with said elongated horizontally oriented endless conveyor for holding the egg-receiving pockets of said egg weighing fixtures at a predetermined elevation at said discharge station to prevent downward movement of the egg-receiving pockets at the instant eggs are transferred thereto from said infeeding conveyor.

References Cited in the file of this patent

UNITED STATES PATENTS

| | | |
|---|---|---|
| 1,538,122 | Kurtz et al. | May 19, 1925 |
| 1,954,164 | Wyland | Apr. 10, 1934 |
| 2,112,823 | Breuilh | Apr. 10, 1938 |
| 2,138,475 | Hilton | Nov. 29, 1938 |
| 2,353,539 | Beach | July 11, 1944 |
| 2,435,706 | Barker | Feb. 10, 1948 |
| 2,648,430 | Wilson | Aug. 11, 1953 |
| 2,727,625 | Sneed | Dec. 20, 1955 |
| 2,843,250 | Niederer et al. | July 15, 1958 |